United States Patent
Hong et al.

(10) Patent No.: US 10,406,403 B2
(45) Date of Patent: Sep. 10, 2019

(54) NANO BISMUTH GOLF BALL WITH IMPROVED CARRY DISTANCE AND DURABILITY

(71) Applicant: VOLVIK INC., Chungcheongbuk-do (KR)

(72) Inventors: Yoo Seok Hong, Chungcheongbuk-do (KR); In Hong Hwang, Gyeonggi-do (KR); Kyung Ahn Moon, Seoul (KR)

(73) Assignee: VOLVIK INC., Chungcheongbuk-do (KR)

(*) Notice: Subject to any disclaimer, the term of this patent is extended or adjusted under 35 U.S.C. 154(b) by 0 days.

(21) Appl. No.: 15/981,115

(22) Filed: May 16, 2018

(65) Prior Publication Data

US 2018/0339198 A1    Nov. 29, 2018

(30) Foreign Application Priority Data

May 25, 2017    (KR) .................. 10-2017-0064626

(51) Int. Cl.
| | |
|---|---|
| *C08K 3/11* | (2018.01) |
| *A63B 37/04* | (2006.01) |
| *A63B 37/06* | (2006.01) |
| *A63B 37/00* | (2006.01) |
| *C08L 9/00* | (2006.01) |

(Continued)

(52) U.S. Cl.
CPC ...... *A63B 37/0051* (2013.01); *A63B 37/0064* (2013.01); *A63B 37/0067* (2013.01); *A63B 37/0074* (2013.01); *A63B 37/0075* (2013.01); *A63B 37/0076* (2013.01); *C08K 3/11* (2018.01); *C08L 9/00* (2013.01); *A63B 37/0022* (2013.01); *A63B 37/0062* (2013.01); *A63B 37/0065* (2013.01); *A63B 37/0066* (2013.01); *A63B 45/00* (2013.01); *A63B 2102/32* (2015.10);

(Continued)

(58) Field of Classification Search
CPC .. C08K 3/11; C08L 2201/03; C08L 2201/011; A63B 37/0051; A63B 37/0074; A63B 37/0075; A63B 37/0076; C08C 4/00
See application file for complete search history.

(56) References Cited

U.S. PATENT DOCUMENTS

| | | | | |
|---|---|---|---|---|
| 5,879,244 A | * | 3/1999 | Hwang | .................. C08K 3/08 |
| | | | | 473/373 |
| 5,952,415 A | * | 9/1999 | Hwang | .............. A63B 37/0003 |
| | | | | 473/372 |

(Continued)

FOREIGN PATENT DOCUMENTS

| | | |
|---|---|---|
| JP | 10-179800 | 7/1998 |
| JP | 2009-11437 A | 1/2009 |
| KR | 10-1367275 B1 | 2/2014 |

*Primary Examiner* — John E Simms, Jr.
(74) *Attorney, Agent, or Firm* — Harness, Dickey & Pierce, P.L.C.

(57) ABSTRACT

Provided is a bismuth golf ball with improved carry distance and fracture strength by adding a nano bismuth reformed by using plasma or a nano bismuth alloy manufactured by using the nano bismuth to a resin composition as a base material as compared with a bismuth golf ball in the related art. Since the nano bismuth golf ball has a more densified internal structure due to a higher content of bismuth as compared with the bismuth golf ball, the resilient elasticity is improved, and thus, the carry distance is increased.

19 Claims, 8 Drawing Sheets

(51) Int. Cl.
*A63B 102/32* (2015.01)
*A63B 45/00* (2006.01)
(52) U.S. Cl.
CPC .. *C08K 2201/003* (2013.01); *C08K 2201/011* (2013.01); *C08L 2205/025* (2013.01)

(56) References Cited

U.S. PATENT DOCUMENTS

| | | | | |
|---|---|---|---|---|
| 2006/0270790 | A1* | 11/2006 | Comeau | A63B 37/0003 524/847 |
| 2013/0225330 | A1* | 8/2013 | Tomita | A63B 37/0075 473/374 |
| 2015/0065269 | A1* | 3/2015 | Hwang | C08K 5/18 473/373 |
| 2015/0111667 | A1* | 4/2015 | Sullivan | A63B 37/0075 473/373 |
| 2015/0283431 | A1* | 10/2015 | Bender | C08K 5/098 473/373 |

* cited by examiner

NANO BISMUTH GOLF BALL WITH IMPROVED CARRY DISTANCE AND DURABILITY

CROSS REFERENCE TO RELATED APPLICATION

The present application claims priority to Korean Patent Application No. 10-2017-0064626, filed in the Korean Patent Office on 25 May 2017, the entire contents of which are incorporated herein by reference.

FIELD

The present invention relates to a nano bismuth golf ball having an improved carry distance and durability, and more particularly, manufacturing nano bismuth or nano bismuth alloy with a small diameter and an increased specific surface area by performing reformation by using a plasma method in the related art and manufacturing a golf ball with an improved carry distance and durability by using the nano bismuth or nano bismuth alloy a filler of a core of the golf ball.

BACKGROUND

A good golf ball denotes a golf ball which has an appropriate spin performance and a long carry distance. However, the spin performance and the carry distance of a golf ball are inversely proportional to each other, and thus, if the spin performance of the golf ball is excellent, the carry distance decreases. As a method of improving the carry distance of the golf ball, a method of changing the composition and physical properties of the core which mainly occupies the golf ball is used. As a first method, there is a method of obtaining a high initial velocity of a solid type golf ball at the time of hitting by improving a hardness of the core thereof. As a second method, there is a method of improving a repulsive force of a golf ball at the time of hitting by improving a compressive strength of the core of the golf ball. As a main material constituting the core of the golf ball, polybutadiene having good resilient elasticity is used. The core of the golf ball is manufactured by preparing a core composition obtained by mixing polybutadiene as a main material, an unsaturated carboxylic acid or a metal salt of unsaturated carboxylic acid as a co-crosslinking agent inducing crosslinking curing, an inorganic or organic filler for controlling the weight of the polybutadiene, and an organic peroxide as an initiator and performing crosslinking formation on the core composition under moderate temperature and pressure conditions for a certain period of time. According to the golf ball manufacturing method in the related art, there are a method of improving the hardness of the core in order to improve the carry distance of the golf ball and a method of improving the hardness of the core and the cover of the golf ball. As the above-described method for improving the hardness of the core of the golf ball, there is a method of adjusting the content of an unsaturated carboxylic acid or a metal salt of an unsaturated carboxylic acid as a co-crosslinking agent. If the content of the co-crosslinking agent is increased, the hardness of the core of the golf ball is improved, and thus, the carry distance is improved. However, the sense of touch of the golf ball is hard, and thus, there are disadvantages in that the feeling of hitting is deteriorated and the spin performance is also decreased. On the contrary, if the content of the co-crosslinking agent is decreased, the sense of touch of the golf ball is soft, and the feeling of hitting is improved. However, the hardness of the core of the golf ball is lowered, and thus, there is a disadvantage in that the carry distance is remarkably decreased. In addition, in the case of improving the hardness of the core and cover of the golf ball, if the golf ball is manufactured by covering a high hardness cover on a high hardness core, the feeling is hard, and thus, the feeling of hitting is deteriorated, and the spin performance is deteriorated. On the contrary, in the case of using a cover formed by using a soft resin, the feeling of hitting and the spin performance are improved, whereas the carry distance is relatively reduced. In addition, the surface at the time of hitting is easily damaged, and thus, there is a disadvantage that the commercial value of the product is lowered. As another method of improving the hardness of the core of the golf ball, there is a method of using the bismuth or bismuth alloy for the core composition. If the bismuth or bismuth alloy is used, the volume is expanded during solidifying, so that the hardness of the core of the golf ball is improved while the weight is not greatly increased. Therefore, there is an advantage that the carry distance of the golf ball is increased. However, the golf ball containing bismuth has an advantage that the resilient elasticity is increased as the added amount of bismuth or bismuth alloy is increased, and the carry distance is increased. But, at the same time, the golf ball containing bismuth has a disadvantage that the fracture strength is decreased, and thus, the durability is reduced.

The patent documents and references cited herein are each incorporated herein by reference to the same extent as if each reference were individually and clearly specified by reference.

Patent Document 1: Korean Registered Patent No. 0179447

Patent Document 2: U.S. Pat. No. 5,879,244

In order to solve the problem of low durability due to a decrease in fracture strength if bismuth is used as a material of a golf ball for improving the carry distance, the inventors of the present invention have manufactured a nano bismuth or nano bismuth alloy having a nano-sized diameter and an improved specific surface area is manufactured by reforming a bismuth of the related art through a plasma method in the related art and have manufactured a golf ball by the nano bismuth or nano bismuth alloy as a filler for the core of the golf ball. The inventors of the present invention have found from experiments that the golf ball with both of the fracture strength and the carry distance improved can be manufactured and have completed the present invention.

SUMMARY

Accordingly, the present invention is to provide a nano bismuth golf ball including a core containing a nano bismuth or nano bismuth alloy; a cover covering the core.

Other objects and technical features of the present invention will be more specifically presented by the following detailed description of the invention, the appended claims, and the drawings.

The present invention relates to a nano bismuth golf ball having improved carry distance and fracture strength.

According to one aspect of the present invention, the present invention provides a nano bismuth golf ball including a core containing a nano bismuth or nano bismuth alloy; and a cover covering the core.

According to another aspect of the present invention, there is provided a nano bismuth golf ball including: a core containing a mixed bismuth obtained by mixing a nano bismuth or nano bismuth alloy and a micro bismuth having a particle diameter of 10 to 50 µm or a micro bismuth alloy having a particle diameter of 10 to 50 µm with a mass ratio of 9:1 to 1:1, respectively; and a cover covering the core.

According to an embodiment of the present invention, the core is a core selected from a group including a single core, a dual core, and a triple core, and at least one or more cores contain the nano bismuth or nano bismuth alloy. In addition, the cover covering the core is any one selected from a group including a single cover, a double cover, and a triple cover.

According to another embodiment of the present invention, the nano bismuth is a nano bismuth having a diameter of 50 to 100 nm manufactured by reforming micro bismuth having a diameter of 60 to 120 µm by using thermal plasma or arc plasma, the nano bismuth alloy is an alloy manufactured by using nano bismuth and one or more metals selected from a group including an alkali metal, platinum, mercury, tin, antimony, cadmium, germanium, lead, copper, silver, and nickel, and the volume of the nano bismuth in the alloy occupies 55% or more.

According to another embodiment of the present invention, the nano bismuth golf ball has a diameter of 42 to 43 mm and a weight of 44 to 47 g.

Provided is a bismuth golf ball with improved carry distance and fracture strength by adding a nano bismuth reformed by using plasma or a nano bismuth alloy manufactured by using the nano bismuth to a resin composition as a base material as compared with a bismuth golf ball in the related art. Since the nano bismuth golf ball according to the present invention has a more densified internal structure due to a higher content of bismuth as compared with the bismuth golf ball, the resilient elasticity is improved, and thus, the carry distance is increased. In addition, although the nano bismuth golf ball according to the present invention has an increased resilient elasticity due to the addition of the nano bismuth, the bismuth is allowed to have a nano size by plasma reformation, and the specific surface area is increased, so that the bonding force with respect to the resin composition is improved, therefore, there is an advantage that the carry distance and the fracture strength are improved as compared with the bismuth golf ball in the related art.

DETAILED DESCRIPTION

According to one aspect of the present invention, the present invention provides a nano bismuth golf ball including a core containing a nano bismuth or nano bismuth alloy; a cover covering the core.

According to another aspect of the present invention, there is provided a nano bismuth golf ball including a core containing: a mixed bismuth obtained by mixing a nano bismuth or nano bismuth alloy and a micro bismuth having a particle diameter of 10 to 50 µm or a micro bismuth alloy having a particle diameter of 10 to 50 µm with a mass ratio of 9:1 to 1:1; and a cover covering the core.

Preferably, the nano bismuth or nano bismuth alloy and the micro bismuth having a particle diameter of 10 to 50 µm or the micro bismuth alloy having a particle diameter of 10 to 50 µm are mixed with a mass ratio of 4:1 to 1:1. More preferably, the nano bismuth or nano bismuth alloy and the micro bismuth having a particle diameter of 10 to 50 µm or the micro bismuth alloy having a particle diameter of 10 to 50 µm are mixed with a mass ratio of 1:1.

The bismuth denotes a metal with a reddish silvery white color indicated by element symbol Bi and atomic number 83, which is quite fragile and easily broken at room temperature and can be extrusion-molded at 220° C. or higher. In the manufacturing of the golf ball, when the bismuth is extrusion-molded and a solidifying process is carried out, the volume of the bismuth is increased by 3.5%. The increase in volume of the bismuth generated during the extrusion molding has the effect of further densifying the structure of the core of the golf ball. The core of the golf ball according to the present invention is manufactured by mixing a polybutadiene rubber, bismuth, a reaction initiator, a co-crosslinking agent, a weight regulator, and others with a kneader or a Banbury mixer and molding with a heat press equipped with upper and lower hemispherical molds with a certain size. In the molding process using the molds, polybutadiene as a main base material and a co-crosslinking agent are bonded by heat and a reaction initiator. At this time, the temperature of the mold is increased to 150° C. or more, and the pressure of 150 tons or more per unit area is applied. The bismuth particles are allowed to exist in the molten state, and the volume of the bismuth particles in the molten state is decreased as compared with those at the normal temperature. At this time, the excess volume formed by the reduction of the bismuth is filled with the main base material expanded by the bonding between the polybutadiene rubber and co-crosslinking agent, and the expanded main base material is no longer expanded by the mold, so that the core density is improved (primary core densification). The core densified primarily through the molding process is densified again (secondary core densified) while undergoing a cooling process at room temperature. The secondary core densification process will be described in detail as follows. When the core is cooled at room temperature after the molding process inducing the primary core densification, the main material (polybutadiene rubber) expanded in the molding process is contracted, and on the contrary, the bismuth is expanded. The bismuth expanded in the cooling process pushes out the excess volume formed by the contracted polybutadiene rubber, and consequently, the structure of the polybutadiene rubber further improves the density due to the expanded bismuth. Therefore, the core manufactured in the above-described process exhibits high resilience characteristics with an improved degree of repulsion even with a small force applied, and as a result, greatly influences the improvement of the carry distance performance of the golf ball. In summary, the core containing bismuth has an improved core density in the manufacturing process and contains high energy as compared with the core not containing bismuth, and the resilient elasticity is improved. As a result, the core containing bismuth has excellent characteristics in the carry distance. Since the densification effect of the core by the bismuth is inversely proportional to the size of the bismuth particle, the smaller the size of the bismuth particle is, the larger the densification effect is.

According to one embodiment of the present invention, the present invention uses nano bismuth with nano particle size. The nano bismuth has a diameter of 10 to 500 nm. Preferably, the nano bismuth has a diameter of 50 to 250 nm.

More preferably, the nano bismuth has a diameter of 80 to 105 nm. If the diameter of the nano bismuth is less than 10 nm, the aggregation phenomenon occurs in the process of mixing the core constituent materials, the densification effect due to the particle size is lowered. If the diameter of nano bismuth exceeds 500 nm, the degree of improvement of the densification effect due to the particle size is small.

According to one embodiment of the present invention, a nano bismuth alloy can be used.

According to another embodiment of the present invention, the bismuth alloy is made of bismuth and one or more metals selected from a group including an alkali metal, platinum, mercury, tin, antimony, cadmium, germanium, lead, copper, silver, and nickel. Preferably, the bismuth alloy is made of bismuth and one or more metals selected from a group including lead, copper, and tin. The lead, copper, and tin have an advantage in easily manufacturing bismuth alloys due to low melting points.

According to an embodiment of the present invention, the nano bismuth alloy is an alloy in which the nano bismuth occupies a volume of 55% or more. If the volume of the nano bismuth is less than 55% in the nano bismuth alloy, the amount of bismuth is insufficient, and thus, the effect of improving the secondary densification by bismuth is small.

The nano bismuth or nano bismuth alloy can be manufactured through a reforming process after obtaining a homogeneous powder bismuth or bismuth alloy from a lump of bismuth or bismuth alloy. The above-described reforming according to the present invention denotes improving a specific surface area or binding reactivity by miniaturizing the particle size of bismuth or bismuth alloy to be a micro size or a nano size or by changing physical properties of the surface using plasma treatment.

If the particle size of the bismuth or bismuth alloy is miniaturized, there is an effect of increasing the surface area. Therefore, since the contact area with the polybutadiene rubber which is the main base material at the time of manufacturing the core of the golf ball is increased, there is an advantage that it is possible to manufacture a golf ball with improved durability.

The nano bismuth or nano bismuth alloy according to the present invention is manufactured from a lump of bismuth or bismuth alloy through the processes of crushing, screening, and reforming. The nano bismuth or nano bismuth alloy according to the present invention is manufactured by a first step of crushing a lump of bismuth or bismuth alloy, a second step of acquiring only homogeneous micro bismuth or micro bismuth alloy by using a screen from a crushed material of the bismuth or bismuth alloy, and a third step of performing plasma treatment on the micro bismuth or micro bismuth alloy to reform the micro bismuth or micro bismuth alloy.

The crushing process in the first step can be used without limitation as long as it is a crusher capable of crushing bismuth or bismuth alloy in the form of lumps so as to be a bismuth or bismuth alloy powder having an average diameter of 60 to 120 μm. According to one embodiment of the present invention, the crusher is a ceramic ball mill crusher.

As the second step, the homogeneous micro bismuth or micro bismuth alloy acquiring process denotes that only bismuth or bismuth alloy having a diameter of 60 to 120 μm is acquired from the crushed material of the bismuth or bismuth alloy by using a screen. According to an embodiment of the present invention, the screen is a 200 to 400 mesh screen.

As the third step, the reforming process of the bismuth or bismuth alloy denotes performing plasma treatment on the bismuth or bismuth alloy.

According to an embodiment of the present invention, the plasma treatment may be performed using thermal plasma or arc plasma. The thermal plasma denotes plasma in which the temperature of the gas is 10,000 Kelvin or more and the temperature of the gas and the temperature of electrons are in an equilibrium state. By using heat generated during the plasma reaction, the reforming of the bismuth or bismuth alloy is performed. The arc plasma treatment denotes reforming the bismuth or bismuth alloy by using heat generated during the occurrence of plasma arc between the electrode and the base material. According to an embodiment of the present invention, the plasma method according to the present invention is an arc plasma method. According to another embodiment of the present invention, if the diameter of the micro bismuth or micro bismuth alloy is less than 60 μm, the particles are too small, and thus, the aggregation phenomenon is excessively displayed in the process of plasma treatment, so that there is a disadvantage that the yield of the reformation using plasma is decreased. If the diameter of the micro bismuth or micro bismuth alloy exceeds 120 μm, there is a disadvantage that the diameter of the reformed bismuth formed by the plasma treatment is increased in units of micrometer (μm).

According to another embodiment of the present invention, the plasma treatment is performed by injecting a micro bismuth or micro bismuth alloy having a diameter of 60 to 120 μm with an inert gas (argon gas) into a plasma reactor and then maintaining the pressure of 350 to 250 torr and flowing an arc current of 150 to 250 A to generate plasma. Preferably, the plasma treatment is performed by injecting a micro bismuth or micro bismuth alloy having a diameter of 60 to 120 μm with an inert gas (argon gas) into a plasma reactor and then maintaining the pressure of 400 torr and flowing an arc current of 200 A to generate plasma. Unless plasma is generated under the above-described conditions, the yield of the nano bismuth or nano-bismuth alloy by the plasma treatment may be decreased.

The core of the golf ball containing the nano bismuth or nano bismuth alloy is formed by reaction of a rubber material as the main base material, a co-crosslinking agent, an active filler, an antioxidant, and a crosslinking reaction initiator. The materials (core constituent substance) used to manufacture the core of the golf ball are compressed and contracted in the mold under the conditions of high temperature and high pressure and are expanded through cooling, so that a high density core having high resilient elasticity and hardness is manufactured.

According to one embodiment of the present invention, the core of the present invention is manufactured by using polybutadiene rubber as the main base material, zinc diacrylate as the co-crosslinking agent, zinc oxide as the active filler, a nano bismuth or nano bismuth alloy as the filler, 2,2'-methylene bis-(4-methyl-6-tert.-butyl-phenol) as the antioxidant, and 40% dicumyl peroxide as the crosslinking reaction initiator. In particular, the mixing ratio of the polybutadiene rubber which is the main base material of the core and the bismuth or bismuth alloy is an important factor determining physical properties of the core.

According to one embodiment of the present invention, the core includes 5 to 20 wt % of the nano bismuth or nano bismuth alloy with respect to 100 wt % of a mixture of either or both selected from a group including a cis-1,4-polybutadiene having a Mooney viscosity of 40 and a cis-1,4-polybutadiene having a Mooney viscosity of 60. The Mooney viscosity denotes a viscosity obtained by measuring the plasticity of a sample rubber from a rotational resistance formed by rotating a metal disk out of a sample rubber to which a certain pressure is applied. The core of the present invention is manufactured by mixing the rubber materials (cis-1,4-polybutadiene rubber) having different viscosities with the same amounts and by mixing 100 wt % of the entire rubber material and 5 to 30 wt % of the nano bismuth or nano bismuth alloy according to the present invention. Preferably, the core of the present invention is manufactured by mixing 100 wt % of the entire rubber material and 10 to 20 wt % of the nano bismuth or nano bismuth alloy according to the present invention. More preferably, the core of the present invention is manufactured by mixing 100 wt % of the rubber material and 11 wt % of nano bismuth or nano bismuth alloy according to the present invention. If the nano bismuth or nano bismuth alloy is used in an amount of less than 5 wt %, the hardness of the core becomes low, and the densification effect by the bismuth or nano bismuth alloy becomes small. If the nano bismuth or nano bismuth alloy is used in an amount of more than 30 wt %, the fracture strength of the core is decreased, and thus, the durability is decreased.

According to one embodiment of the present invention, the golf ball according to the present invention includes a core selected from a group including a single core, a double core, and a triple core, and at least one or more cores contain the nano bismuth or nano bismuth alloy.

According to another embodiment of the present invention, the golf ball according to the present invention includes a cover covering the core and further includes a coating layer covering the cover.

The following golf balls according to the present invention can be manufactured.

(1) Two-Piece Solid Golf Ball

Figure 4:
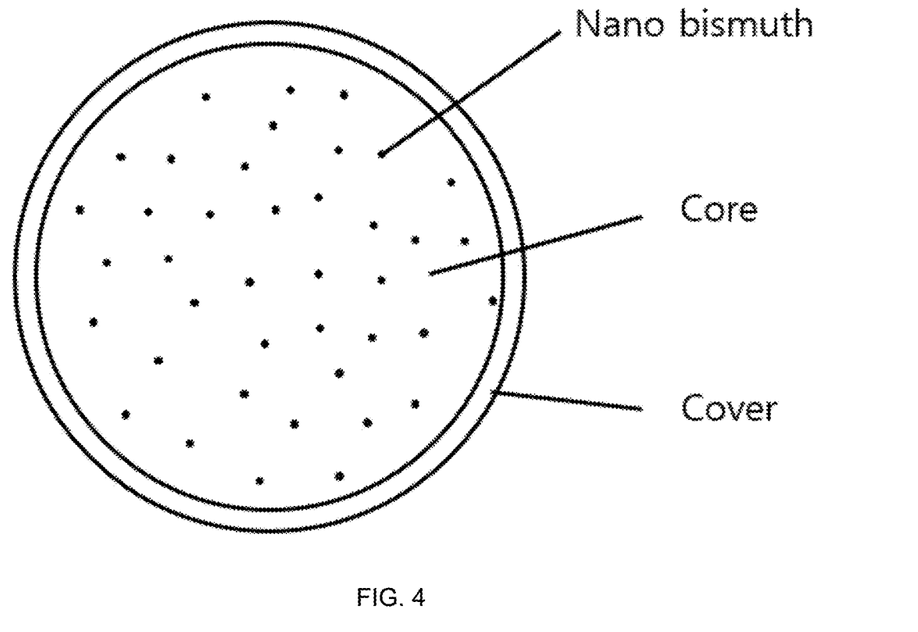
FIG. 4 illustrates a cross-sectional view of a two-piece golf ball according to the present invention.

The two-piece solid golf ball includes a single core containing the nano bismuth or nano bismuth alloy and a cover covering the single core (refer to FIG. 4).

(2) Three-Piece Solid Golf Ball

Figure 5:
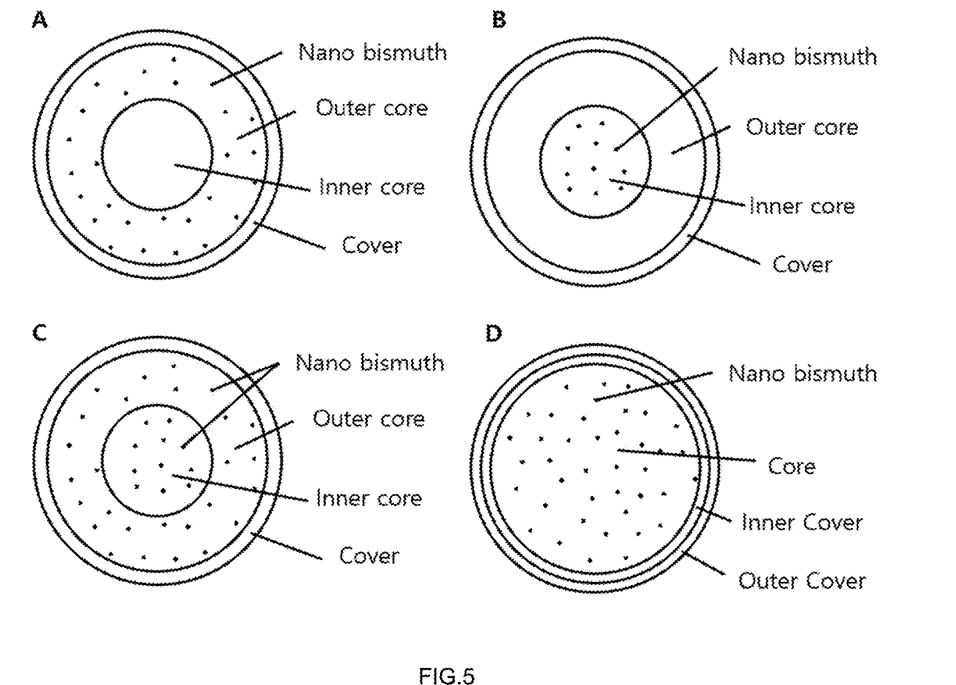
FIG. 5 illustrates a cross-sectional view of a three-piece golf ball according to the present invention.

The three-piece solid golf ball includes a dual core having an inner core and an outer core, and one or two cores of the dual core contain the nano bismuth or nano bismuth alloy. In addition, in the case where the core of the golf ball is a single core, a double cover having an inner cover and an outer cover is located outside the single core. In the case where the core of the golf ball is a core, a single cover is located outside the dual core (refer to FIG. 5).

(3) Four-Piece Solid Golf Ball

Figure 6:
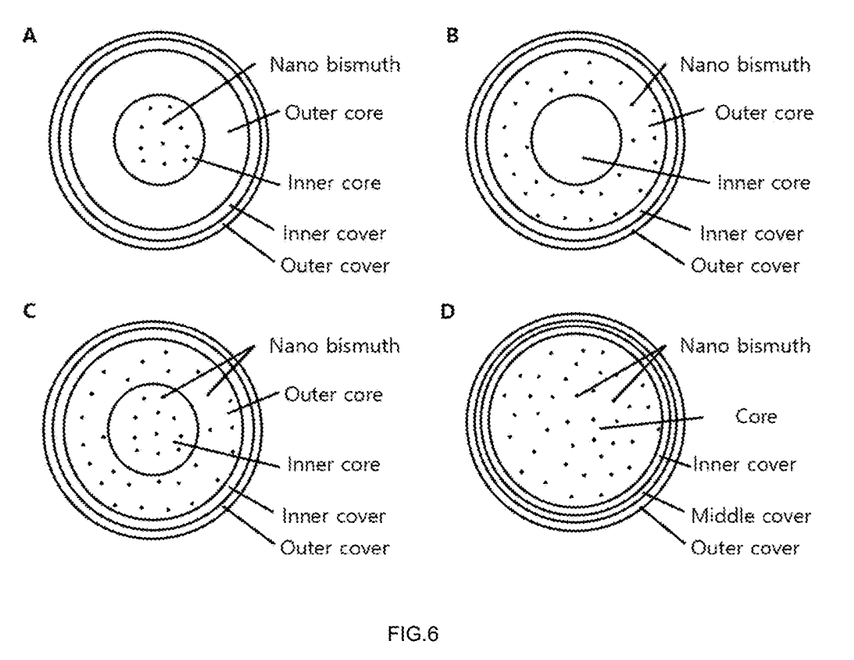
FIG. 6 illustrates a cross-sectional view of a four-piece golf ball according to the present invention.

The four-piece solid golf ball includes a single core or a dual core having an inner core and an outer core, and one or two cores of the dual core contain the nano bismuth or nano bismuth alloy. In addition, in the case where the core of the golf ball is a single core, a triple cover having an inner cover, a middle cover, and an outer cover is located outside the single core. In the case where the core of the golf ball is a dual core, a double cover having an inner cover and an outer cover is located outside the dual core (refer to FIG. 6).

(4) Five-Piece Solid Golf Ball

Figure 7:
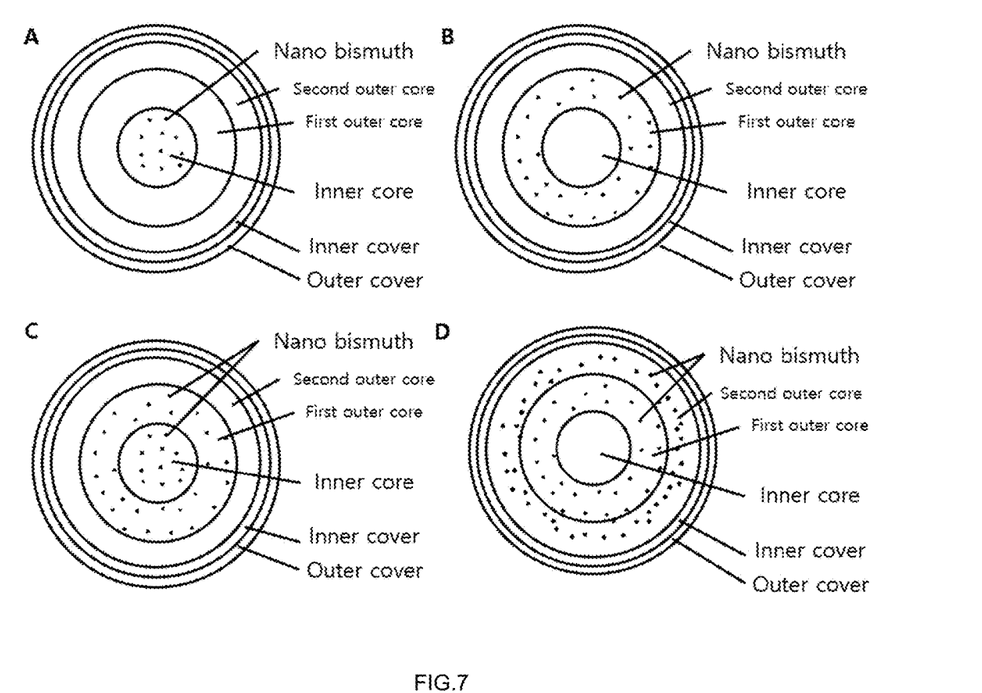
FIG. 7 illustrates a cross-sectional view of a five-piece golf ball according to the present invention.

The five-piece solid golf ball includes a triple core having an inner core, a first outer core, and a second outer core, and one or more cores of the triple core contains the nano bismuth or nano bismuth alloy. In addition, a double cover having an inner cover and an outer cover is located outside the second outer core of the triple core (refer to FIG. 7).

The golf ball includes a dual core having an inner core and an outer core, and one or more cores of the dual core contain the nano bismuth or nano bismuth alloy. In addition, a triple cover having an inner cover, a middle cover and an outer cover is located outside the dual core. In the figure illustrating the five-piece sold golf ball including a dual core and a triple cover, a structure of a three-piece dual core and a four-piece triple cover is omitted in illustration, and a triple core and a double cover are representatively illustrated in FIG. 7.

(5) Six-Piece Solid Golf Ball

The six-piece solid golf ball includes a triple core having an inner core, a first outer core, and a second outer core, and one or more cores of the triple core contains the nano bismuth or nano bismuth alloy. In addition, a triple cover having an inner cover, a middle cover, and an outer cover is located outside the second outer core of the triple core (refer to FIG. 8).

Figure 8:
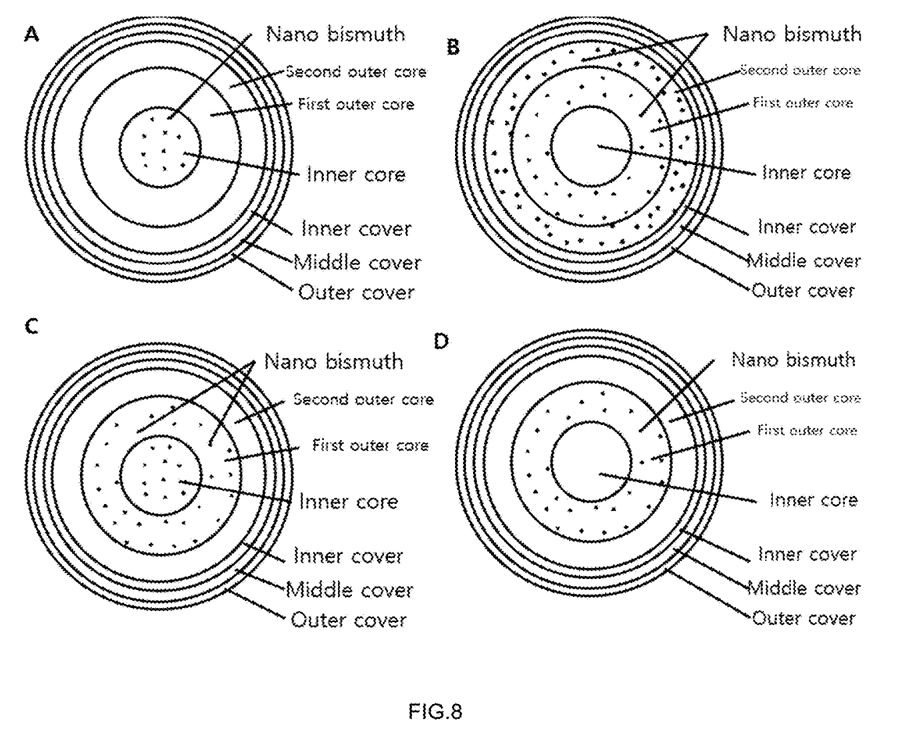
FIG. 8 illustrates a cross-sectional view of a six-piece golf ball according to the present invention.

Other six-piece golf balls may include a single core and a quintuple cover, a dual core and a quadruple cover, a quadruple core and a double cover, or a quintuple core and a single cover. Among the inner core through the fifth core, one or more cores contain the nano bismuth or nano bismuth alloy, and in the figure, it is omitted and represented by 8.

The coating layer that wraps and protects the cover of the golf ball can be additionally included in all the golf balls having all configurations. Since the coating layer is very thin, the coating layer is not particularly included in the composition of the golf ball.

EXAMPLE

Example 1: Manufacturing of Plasma Reformed Nano Bismuth Golf Ball

1) Manufacturing of Plasma Reformed Nano Bismuth

Figure 2:
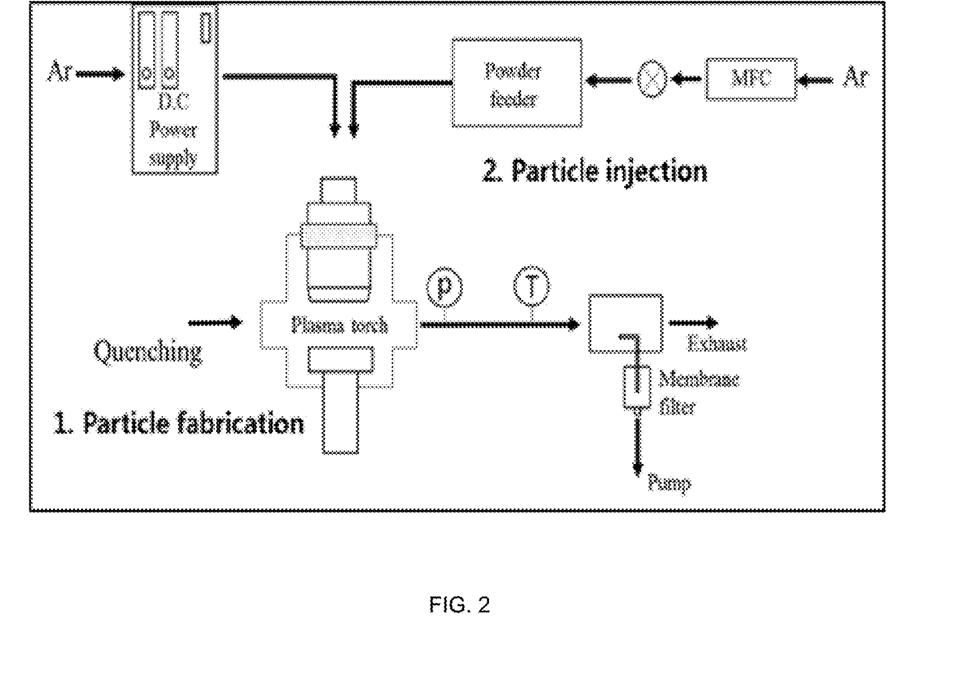
FIG. 2 illustrates a schematic view of a plasma reactor. MFC denotes a mass flow controller; Ar denotes argon gas; ⓣ indicates a temperature sensor; ⓟ indicates a pressure sensor.
Figure 3:
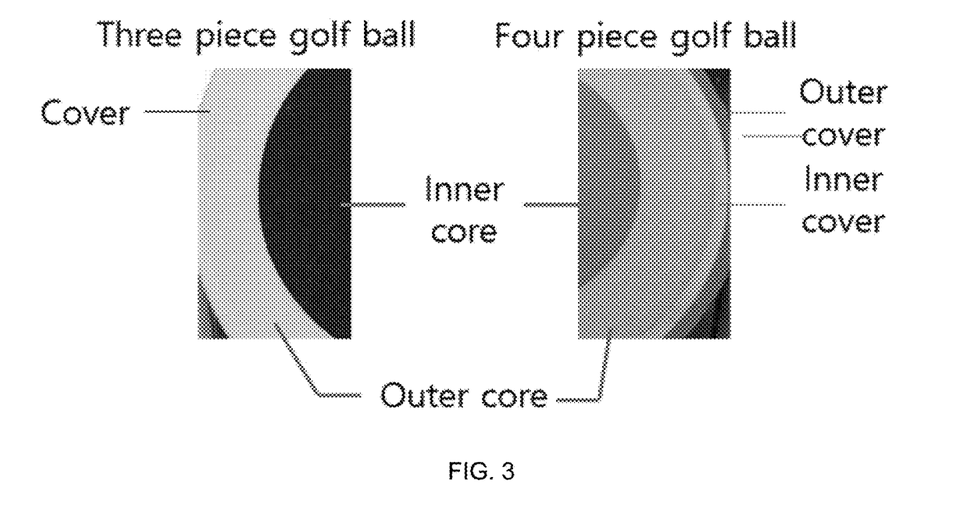
FIG. 3 illustrates a cross-sectional view of a three-piece golf ball and a four-piece golf ball according to the present invention.

A lump of bismuth was crushed by using a ceramic ball mill, and a micro bismuth powder including only bismuth particles having a diameter of 60 to 120 μm was manufactured from the crushed bismuth by using a 200-400 mesh screen. Using the mass flow controller, the micro bismuth powder was injected into a plasma reactor at a rate of 3 g/min, and an argon gas as an inert gas was injected at the same time in order to prevent the occurrence of a side reaction (refer to FIG. 2). The pressure of the reactor into which the micro bismuth powder and the argon gas were injected was maintained at 400 torr, and plasma was generated with an arc current of 200 A by using a 1.6 kW power source. After that, a cooled argon gas was injected to quench the bismuth vaporized by the plasma. The aggregated bismuth was removed from the plasma reformed nano bismuth sintered through the quenching process by using a filter to acquire only the plasma reformed nano bismuth with an average diameter of 95 nm.

(2) Manufacturing of Inner Core and Outer Core of Plasma Reformed Nano Bismuth Golf Ball The inner core and the outer core used for manufacturing the plasma reformed nano bismuth golf ball was manufactured by using the plasma reformed nano bismuth with a particle size of 50 to 100 nm, two types of polybutadiene rubbers, a co-crosslinking agent, an active filler, a filler, an antioxidant, and a crosslinking reaction initiator. Zinc diacrylate was used as the co-crosslinking agent, Zinc oxide (ZnO) was used as the active filler, 2,2'-methylene bis-(4- methyl-6-tert.-butyl-phenol) was used as the an antioxidant, and 40% dicumyl peroxide was used as the crosslinking reaction initiator (refer to Table 1). In order to manufacture the inner core and the outer core of the plasma reformed nano bismuth golf ball, the plasma reformed nano bismuth, the base rubber, the co-crosslinking agent, the active filler, the filler, and the antioxidant were inserted and mixed in a kneader according to the ratios listed in Table 1 for 30 minutes. In order to adjust the temperature of the mixture, the mixture was inserted in to a sealed cooling chamber with a separate dehumidifier and a cooling device installed, and thus, the temperature of the mixture was maintained at room temperature (20 to 25° C.) for a certain time period. The mixture maintained at the temperature was placed in a two-roll mill with a cooling device installed and capable of maintaining a constant temperature. While 40% dicumyl peroxide as the crosslinking reaction initiator was gradually added, a crosslinking curing mixture was manufactured by milling. The crosslinking curing mixture is cut into an appropriate size in a preliminary molding machine, and then, molding and crosslinking reactions (crosslinking curing reaction) was performed by using a thermo-compression molding machine provided with 60 molds (cavities). The crosslinking curing reaction was carried out through a primary molding step, a gas removing step, a secondary molding step, a grinding step, and a cleaning/drying step.

First, the crosslinking curing mixture cut into an appropriate size by the preliminary molding machine was placed in the mold of a thermo-compression molding machine. After that, the temperature was adjusted to 100 to 105° C., and the primary molding was performed by applying the pressure of 200 tons (primary molding step). After the primary molding was started, for 8 minutes, the temperature of the molding machine was gradually increased to 165 to 170° C., and by removing the applied pressure of 200 tons once or twice, the gas existing in the product was removed (gas removing step). After performing the gas removing step, the pressure of the molding machine was again increased to 200 tons, and the temperature of the molding machine was maintained at 165 to 170° C. for 20 minutes to perform secondary molding. After the temperature of the molding machine was gradually decreased for 7 minutes, the pressure was released, and the formed core was purged from the mold (secondary molding step). The core taken out was cooled to room temperature, and the core was grinded into an appropriate size by using a centerless grinder. After that, washing and drying was performed (grinding, washing, and drying steps).

The core manufactured above can be used for a golf ball with a single core. The core is manufactured with a smaller size, and another core is formed outside by the above-described molding method, so that the dual core having an inner core and an outer core can be used for a golf ball with a dual core. The golf balls according to Examples 1 and 2 of the present invention and Comparative Example are manufactured by using a dual core having an inner core and an outer core.

(3) Manufacturing of Cover Layer and Polyurethane Coating Layer of Plasma Reformed Nano Bismuth Golf Ball The golf ball according to the present invention was manufactured by forming a cover on the dual core manufactured above.

The cover includes a cover layer formed on the surface of the dual core and a polyurethane coating layer formed on the surface of the cover. The cover layer manufacturer by a method of injecting a cover master batch prepared by mixing Na-ionomer (Surlyn 8940 produced by Du Pont Co.), Zn-ionomer (Surlyn 9910 produced by Du Pont Co.), and titanium oxide ($TiO_2$) onto the surface of the dual core and performing molding (refer to Table 1). The golf ball on which the cover layer was formed was polished, trimmed on the surface, washed and dried, and dried at room temperature. The polyurethane coating layer was manufactured by preparing a coating liquid for a polyurethane coating layer containing a polyurethane solution and a curing agent, applying the coating liquid on the surface of the cover layer of the golf ball, and drying with hot air.

The plasma reformed nano bismuth golf ball (Example 1) manufactured by the above-described method is a three-piece golf including a dual core and a single cover having a diameter of 42.7 to 42.75 mm and having a weight of 45.3 to 45.7 g. Table 1 lists the contents of the materials used for manufacturing the inner cores and the outer cores of the plasma reformed nano bismuth golf ball (Example 1), the mixed bismuth golf ball (Example 2), and the existing bismuth golf ball (Comparative Example). The materials for manufacturing the inner core and the outer core in Table 1 below were used in units of wt % with respect to 100% total polybutadiene rubber (cis-1,4-polybutadiene with Mooney viscosity of 40+polybutadiene rubber (cis-1,4-polybutadiene) with Mooney viscosity of 60). The materials for manufacturing the master batch for the cover in Table 1 below were used in units of wt % with respect to 100 wt % Na-ionomer. The materials for manufacturing the polyurethane coating liquid in Table 1 were used in units of wt % with respect to 100 wt % polyurethane solution.

TABLE 1

| | Raw Material | Plasma-Reformed Nano Bismuth Golf Ball (Example 1) | Mixed Bismuth Golf Ball (Example 2) | Existing Bismuth Golf Ball (Comparative Example) | Remarks |
|---|---|---|---|---|---|
| Inner Core | polybutadiene rubber(cis-1,4-polybutadiene)-Mooney viscosity 40 | 50 wt % | 50 wt % | 50 wt % | Base Material Rubber |
| | polybutadiene rubber(cis-1,4-polybutadiene)-Mooney viscosity 60 | 50 wt % | 50 wt % | 50 wt % | Base Material Rubber |
| | zinc diacrylate | 30 wt % | 30 wt % | 30 wt % | Co-Crosslinking Agent |
| | zinc oxide(ZnO) | 5.5 wt % | 5.5 wt % | 5.5 wt % | Active Filler |
| | nano bismuth | 11 wt % | 5.5 wt % | 0 wt % | Filler |
| | bismuth | 0 wt % | 5.5 wt % | 11 wt % | Filler |
| | 2,2'-methylene bis-(4-methyl-6-tert.-butyl phenol) | 0.5 wt % | 0.5 wt % | 0.5 wt % | Antioxidant |
| | 40% dicumyl peroxide | 3.5 wt % | 3.5 wt % | 3.5 wt % | Crosslinking Reaction Initiator |
| Outer Core | polybutadiene rubber(cis-1,4-polybutadiene)-Mooney viscosity 40 | 50 wt % | 50 wt % | 50 wt % | Base Material Rubber |

TABLE 1-continued

|  | Raw Material | Plasma-Reformed Nano Bismuth Golf Ball (Example 1) | Mixed Bismuth Golf Ball (Example 2) | Existing Bismuth Golf Ball (Comparative Example) | Remarks |
|---|---|---|---|---|---|
|  | polybutadiene rubber(cis-1,4-polybutadiene)-Mooney viscosity 60 | 50 wt % | 50 wt % | 50 wt % | Base Material Rubber |
|  | zinc diacrylate | 30 wt % | 30 wt % | 30 wt % | Co-Crosslinking Agent |
|  | zinc oxide(ZnO) | 5.5 wt % | 5.5 wt % | 5.5 wt % | Active Filler |
|  | nano bismuth | 11 wt % | 5.5 wt % | 0 wt % | Filler |
|  | bismuth | 0 wt % | 5.5 wt % | 11 wt % | Filler |
|  | 2,2'-methylene bis-(4-methyl-6-tert.-butyl phenol) | 0.5 wt % | 0.5 wt % | 0.5 wt % | Antioxidant |
|  | 40% dicumyl peroxide | 3.5 wt % | 3.5 wt % | 3.5 wt % | Crosslinking Reaction Initiator |
| Mater Batch For Cover | Na-ionomer | 50 wt % | 50 wt % | 50 wt % | — |
|  | Zn-ionomer | 50 wt % | 50 wt % | 50 wt % | — |
|  | titanium oxide | 3 wt % | 3 wt % | 3 wt % | — |
| Polyurethane Coating Liquid | polyurethane solution | 3 wt % | 3 wt % | 3 wt % | — |
|  | curing agent | 1 wt % | 1 wt % | 1 wt % | — |

Example 2: Manufacturing of Mixed Bismuth Golf Ball

An inner core and an outer core were manufactured by mixing the plasma reformed nano bismuth having a particle diameter of 50 to 100 nm manufactured in Example 1 and the bismuth having a particle diameter of 10 to 50 μm used for manufacturing the bismuth golf ball in the related art with a ratio (mass ratio) of 1:1, and a mixed bismuth golf ball was manufactured by forming a cover layer and a polyurethane coating layer on the dual core.

(1) Manufacturing of Mixed Bismuth

In order to manufacture the mixed bismuth, the plasma reformed nano bismuth of Example 1 and the existing bismuth were prepared. As the plasma reformed nano bismuth, used was a plasma reformed nano bismuth having a particle size of 50 to 100 nm manufactured by crushing a lump of the bismuth by using a ceramic ball mill in the same method as in Example 1, sorting bismuth particles having a diameter of 60 to 120 μm, and performing a plasma treatment. As the existing bismuth, used was a micro bismuth powder including only bismuth particles having a particle size of 60 to 120 μm manufactured by crushing a lump of the bismuth by using a ceramic ball mill and sorting the crushed bismuth by using a 200-400 mesh screen. In the mixing bismuth, the plasma reformed nano bismuth and the existing bismuth were mixed at a mixing ratio (mass ratio) of 1:1. According to the contents listed in Table 1, the plasma reformed nano bismuth and the existing bismuth are contained at a mass ratio of 50:50 in units of wt % with respect to 100 wt % polybutadiene rubber. This means that the two bismuths are contained at a mass ratio of 1:1.

(2) Manufacturing of Mixed Bismuth Golf Ball

The inner core and outer core used for the mixed bismuth golf ball (Example 2) were manufactured by using a mixed bismuth manufactured by mixing the plasma reformed nano bismuth having a particle diameter of 50 to 100 nm and the bismuth (existing bismuth) having a particle diameter of 10 to 50 μm with a ratio of 50%:50% (a mass ratio of 1:1), two types of polybutadiene rubbers, a co-crosslinking agent, an active filler, a filler, an antioxidant, and a crosslinking reaction initiator. Similarly to Example 1 described above, as he co-crosslinking agent, the active filler, the antioxidant, and the crosslinking reaction initiator, zinc diacrylate, zinc oxide (ZnO), 2,2'-methylene bis-(4-methyl-6-tert.-butyl-phenol) and 40% dicumyl peroxide (refer to Table 1) were used, respectively.

The inner core and the outer core of the mixed bismuth golf ball were manufactured by mixing the materials and performing the crosslinking curing reaction and the molding process in the same method as in Example 1. The cover layer and the polyurethane coating layer of the mixed bismuth golf ball were also formed on the surface of the core in the same method as in Example 1, so that the mixed bismuth golf ball was manufactured.

Similarly to the plasma reformed nano bismuth golf ball (Example 1), the mixed bismuth golf ball (Example 2) is three-piece golf ball including a dual core and a single cover having a diameter of 42.7 to 42.75 mm and a weight of 45.3 to 45.7 g.

Comparative Example: Existing Bismuth Golf Ball

A golf ball manufactured by using existing bismuth having a particle diameter of 1 including a dual core 0 to 50 μm as a filler was manufactured. In the existing bismuth golf ball (Comparative Example), all the materials excluding the bismuth as the filler are the same as those of the plasma reformed nano bismuth golf ball (Example 1) and the mixed bismuth golf ball (Example 2) (refer to Table 1). In addition, the manufacturing method is also the same as those of the plasma reformed nano bismuth golf ball (Example 1) and mixed bismuth golf ball (Example 2).

The existing bismuth golf ball (Comparative Example) is a three-piece golf ball with a dual core and a single cover having a diameter of 42.7 to 42.75 mm and a weight of 45.3 to 45.7 g similarly to the plasma reformed nano bismuth golf ball (Example 1) and the mixed bismuth golf ball (Example 2).

Experimental Example 1: Physical Properties of Plasma Reformed Nano Bismuth

Figure 1:
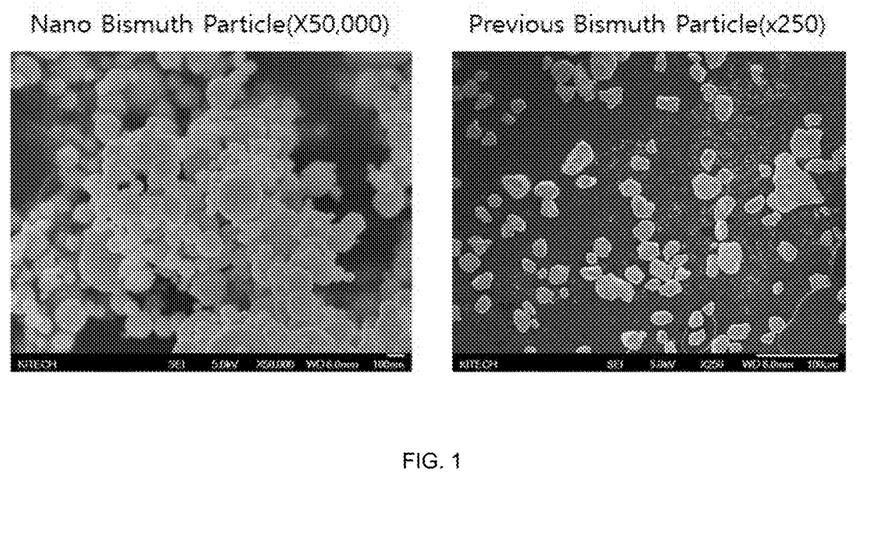
FIG. 1 illustrates a photograph of plasma reformed nano bismuth particles and existing micro bismuth particles imaged by a scanning electron microscope.

In order to confirm the physical properties of the particles of the plasma reformed nano bismuth, the size and shape of the particles were imaged by using a scanning electron microscope and compared and analyzed. As a result of the analysis, it was found that the plasma reformed nano bismuth according to the present invention had a particle sizes 1000 to 2000 times smaller and a specific surface area 500 or more times larger than those of the existing bismuth (refer to FIG. 1).

Experimental Example 2: Measurement of Restitution Coefficient and Fracture Strength of Golf Ball In order to compare and analyze the repulsive force and durability among the plasma reformed nano bismuth golf ball (Example 1), the mixed bismuth golf ball (Example 2), and the existing bismuth golf ball (Comparative Example), the coefficient of restitution and the fracture strength of the golf balls were measured by using a coefficient-of-restitution (COR) measurement apparatus (produced by Automated Design Corporation). For the measurement of the repulsive force (coefficient of restitution) of the golf balls, six golf balls were randomly selected from the cores and golf balls manufactured in Examples and Comparative Examples described above, and for the six selected golf balls, the measurement was performed under the condition of a speed of 125±2 ft/sec by attaching barrel #5 and barrel #3 to the coefficient-of-restitution measurement apparatus. For the measurement of the durability (fracture strength) of the golf balls, six golf balls were randomly selected from the golf balls manufactured in Examples and Comparative Examples described above. The fracture strength of the golf ball was calculated by the method of measuring the number of times of hitting under the condition of a speed of 175±2 ft/sec causing cracks of the golf balls. The results of measurement of the coefficient of restitution and the fracture strength are listed in Table 2 below.

restitution and the fracture strength of the plasma reformed nano bismuth golf ball, it is found that the coefficient of restitution and the fracture strength of the mixed bismuth golf ball are reliably improved as compared with those of the existing bismuth golf ball. The results indicate that the repulsive force and fracture strength of the golf ball manufactured by using the bismuth are improved according to the content of plasma reformed nano bismuth.

In particular, an increase in coefficient of restitution is directly related to an increase in carry distance. Table 3 of Experimental Example 3 lists the change in carry distance according to the coefficient of restitution.

Experimental Example 3: Measurement of Carry Distance of Golf Ball

An increase in coefficient of restitution is directly related to an increase in carry distance. According to Experimental

TABLE 2

|  | Sample | Test Method | Plasma-Reformed Nano Bismuth Golf Ball (Example 1) | Mixed Bismuth Golf Ball (Example 2) | Existing Bismuth Golf Ball (Comparative Example) |
|---|---|---|---|---|---|
| Coefficient Of Restitution (COR) | core | barrel #5, speed 125 ft/sec ± 2 ft/sec | 0.8078 | 0.8055 | 0.8034 |
|  | golf ball | barrel #3, speed 125 ft/sec ± 2 ft/sec | 0.8179 | 0.8128 | 0.8109 |
| Fracture Strength (times) | golf ball | barrel #3, speed 175 ft/sec ± 2 ft/sec | 178.6 times | 141.2 times | 135.4 times |

According to the experimental results, it can be understood that the coefficient of restitution and the fracture strength of the plasma reformed nano bismuth golf ball (Example 1) are improved as compared with the mixed bismuth golf ball (Example 2) and the existing bismuth golf ball (Comparative Example). The coefficient of restitution of the plasma reformed nano bismuth golf ball (Example 1) is improved by 0.0023 and 0.0070, respectively, as compared with the coefficient of restitution of the mixed bismuth golf ball (Example 2) and the existing bismuth golf ball (Comparative Example). With respect to the fracture strength of the plasma reformed nano bismuth golf ball (Example 1), hitting of more than 37.4 times and 43 times, respectively, is needed to generate cracks as compared with the mixed bismuth golf ball (Example 2) and the existing bismuth golf ball (Comparative Example).

According to the results in the related art, if the existing bismuth (bismuth having a particle diameter of 10 to 50 μm) is used for manufacturing the golf ball, the coefficient of restitution of the core of the golf ball is improved, and thus, the effect of increasing the carry distance is improved. However, at the same time, the fracture strength is decreased, and thus, the durability is decreased. According to the experimental results of the present invention, if the golf ball is manufactured by using the plasma reformed nano bismuth having a smaller particle diameter, the coefficient of restitution and the fracture strength are simultaneously increased, and thus, the golf ball with improved carry distance and durability can be manufactured.

In addition, in the case of the mixed bismuth golf ball manufactured by mixing the plasma reformed nano bismuth and the existing bismuth with a ratio of 50%:50%, although the coefficient of restitution and the fracture strength of the mixed bismuth golf ball do not reach the coefficient of Example 2 described above, there is a result that the repulsive force is strengthened by using the plasma reformed nano bismuth. Therefore, in order to confirm that the increase in repulsive force according to the use of the plasma reformed nano bismuth results in the increase in carry distance of the golf ball, the carry distances of the plasma reformed nano bismuth golf ball (Example 1), the mixed bismuth golf ball (Example 2), and the existing bismuth golf ball (Comparative Example) were measured and compared by using Swing Robot produced by Golf Laboratories in U.S. The Swing Robot produced by Golf Laboratories in U.S. is used for the golf ball certification test of R&A (the Royal & Golf Association of the United Kingdom) and USGA (United States Golf Association) as golf ball certification institutes. A driver club is mounted on Swing Robot, and the head speed is set to 90 MPH. 10 plasma reformed nano bismuth golf balls (Example 1), 10 mixed bismuth golf balls (Example 2), and 10 existing bismuth golf balls (Comparative Example) are hit, and the carry distances are measured. The carry distances of the golf balls are measured by using Trackman-Pro produced by Trackman Golf in Denmark as a radar tracking type golf ball flight measurement apparatus using the Doppler effect. The measurement apparatus is used by a lot of PGA and LPGA professional players and are very precise instruments that can be analyzed with Workbench data, and the error rate with respect to actual measurement data and is 200±1 m. Table 3 lists the measurement results of the carry distances of the plasma reformed nano bismuth golf ball (Example 1), the mixed bismuth golf ball (Example 2) and the existing bismuth golf ball (Comparative Example).

TABLE 3

|  | plasma reformed nano bismuth golf ball (Example 1) | Mixed Bismuth Golf Ball (Example 2) | Existing Bismuth Golf Ball (Comparative Example) |
|---|---|---|---|
| Coefficient Of Restitution of Golf Ball | 0.8179 | 0.8128 | 0.8109 |
| hitting 1 | 215.3 m | 212.1 m | 211.6 m |
| hitting 2 | 212.7 m | 210.6 m | 209.3 m |
| hitting 3 | 213.5 m | 212.2 m | 210.0 m |
| hitting 4 | 212.2 m | 211.8 m | 208.7 m |
| hitting 5 | 213.3 m | 209.4 m | 205.5 m |
| hitting 6 | 215.1 m | 212.2 m | 207.9 m |
| hitting 7 | 214.9 m | 208.9 m | 208.3 m |
| hitting 8 | 215.7 m | 213.3 m | 209.2 m |
| hitting 9 | 216.2 m | 212.2 m | 212.1 m |
| hitting 10 | 215.6 m | 210.1 m | 211.5 m |
| Average | 214.5 m | 211.1 m | 209.4 m |

According to the measurement results, it was found that the carry distance of the plasma reformed nano bismuth golf ball (Example 1) increased by 1.61% (average 3.4 m) on average, as compared with the carry distance of the mixed bismuth golf ball (Example 2). It was found that the carry distance of the plasma reformed nano bismuth golf ball increased by 2.44% (average 5.1 m) on average, as compared with the carry distance of the existing bismuth golf ball (Comparative Example). The results of Experimental Example 3 are consistent with the measurement result of the coefficient of restitution of Experimental Example 2. According to the result of Experimental Example 2, it was found that the coefficient of restitution of the plasma reformed nano bismuth golf ball (Example 1) was increased by 0.0023 as compared with the coefficient of restitution of the mixed bismuth golf ball (Example 2). The coefficient of restitution of the plasma reformed nano bismuth golf ball was increased by 0.0070 as compared with the coefficient of restitution of the existing bismuth golf ball (Comparative Example). With respect to the fracture strength of the golf ball, it was found that, if the plasma reformed nano bismuth golf ball (Example 1) was hit 37.4 times or more as compared with the mixed bismuth golf ball (Example 2) and was hit 43 times as compared with the existing bismuth golf ball (Comparative Example), the golf ball was broken.

Therefore, if the core is manufactured by using the plasma reformed nano bismuth as a filler and the golf ball is manufactured by using the core, it is possible to manufacture a high performance golf ball having no decrease in fracture strength which is a disadvantage of the existing bismuth golf ball and having the improved carry distance and durability As described herein, the specific examples are representative preferred embodiments of the present invention and do not limit the scope of the present invention. It will be apparent to those skilled in the art that variations and other uses of the present invention do not depart from the scope of the invention as set forth in the claims herein.

What is claimed is:

1. A nano bismuth golf ball comprising:
a core containing a nano bismuth or nano bismuth alloy; and
a cover covering the core.

2. A nano bismuth golf ball comprising:
a core containing a mixed bismuth obtained by mixing a nano bismuth or nano bismuth alloy and a micro bismuth having a particle diameter of 10 to 50 μm or a micro bismuth alloy having a particle diameter of 10 to 50 μm with a mass ratio of 9:1 to 1:1, respectively; and
a cover covering the core.

3. The nano bismuth golf ball according to claim 1, wherein the core is a core selected from a group consisting of: a single core comprising the nano bismuth or nano bismuth alloy, a double core comprising an inner core and an outer core, wherein at least one of the inner core and the outer core contains the nano bismuth or nano bismuth alloy, and a triple core comprising an inner core, a first outer core, and a second outer core, wherein at least one of the inner core, first outer core, and the second outer core contains the nano bismuth or nano bismuth alloy.

4. The nano bismuth golf ball according to claim 2, wherein the core is a core selected from a group consisting of: a single core comprising the mixed bismuth, a double core comprising an inner core and an outer core, wherein at least one of the inner core and the outer core contains the mixed bismuth, and a triple core comprising an inner core, a first outer core, and a second outer core, wherein at least one of the inner core, the first outer core, and second outer core contains the mixed bismuth.

5. The nano bismuth golf ball according to claim 1, wherein the cover is one selected from a group including a single cover, a double cover, and a triple cover.

6. The nano bismuth golf ball according to claim 2, wherein the cover is one selected from a group including a single cover, a double cover, and a triple cover.

7. The nano bismuth golf ball according to claim 1, wherein the core contains 5 to 20 wt % nano bismuth or nano bismuth alloy with respect to a total weight of a mixture of one or two selected from a group including cis-1,4-polybutadiene having a Mooney viscosity of 40 and cis-1,4-polybutadiene having a Mooney viscosity of 60.

8. The nano bismuth golf ball according to claim 2, wherein the core contains 5 to 20 wt % nano bismuth or nano bismuth alloy with respect to a total weight of a mixture of one or two selected from a group including cis-1,4-polybutadiene having a Mooney viscosity of 40 and cis-1,4-polybutadiene having a Mooney viscosity of 60.

9. The nano bismuth golf ball according to claim 1, wherein the nano bismuth or nano bismuth alloy has a diameter of 10 to 500 nm.

10. The nano bismuth golf ball according to claim 2, wherein the nano bismuth or nano bismuth alloy has a diameter of 10 to 500 nm.

11. The nano bismuth or nano bismuth alloy of claim 1, wherein the nano bismuth or nano bismuth alloy is obtained by plasma treatment using thermal plasma or arc plasma.

12. The nano bismuth golf ball according to claim 1,
wherein the core contains the nano bismuth alloy, and
wherein the nano bismuth alloy is manufactured by performing plasma treatment on a micro bismuth alloy made of bismuth and one or two or more of metals selected from a group including an alkali metal, platinum, mercury, tin, antimony, cadmium, germanium, lead, copper, silver, and nickel.

13. The nano bismuth golf ball according to claim 2,
wherein the core contains the nano bismuth alloy, and
wherein the nano bismuth alloy is manufactured by performing plasma treatment on a micro bismuth alloy made of bismuth and one or two or more of metals selected from a group including an alkali metal, platinum, mercury, tin, antimony, cadmium, germanium, lead, copper, silver, and nickel.

14. The nano bismuth golf ball according to claim 12, wherein the nano bismuth alloy is an alloy where the bismuth occupies a volume of 55% or more of a total volume of the alloy.

15. The nano bismuth golf ball according to claim 13, wherein the nano bismuth alloy is an alloy where the bismuth occupies a volume of 55% or more of a total volume of the alloy.

16. The nano bismuth golf ball according to claim 1, further comprising a coating layer covering the cover.

17. The nano bismuth golf ball according to claim 2, further comprising a coating layer covering the cover.

18. The nano bismuth golf ball according to claim 1, wherein the nano bismuth golf ball has a diameter of 42 to 43 mm and a weight of 44 to 47 g.

19. The nano bismuth golf ball according to claim 2, wherein the nano bismuth golf ball has a diameter of 42 to 43 mm and a weight of 44 to 47 g.

* * * * *